United States Patent [19]

Uchida

[11] Patent Number: 5,479,783

[45] Date of Patent: Jan. 2, 1996

[54] ABSORPTION CHILLER

[75] Inventor: Shuichiro Uchida, Ibaraki, Japan

[73] Assignee: Hitachi, Ltd., Tokyo, Japan

[21] Appl. No.: 223,748

[22] Filed: Apr. 6, 1994

[30] Foreign Application Priority Data

Apr. 7, 1993 [JP] Japan .................................. 5-080361

[51] Int. Cl.$^6$ .................................................. F25B 15/00
[52] U.S. Cl. ................................................. 62/101; 62/476
[58] Field of Search ............................ 62/101, 476, 335, 62/322

[56] References Cited

U.S. PATENT DOCUMENTS

| | | | |
|---|---|---|---|
| 2,464,072 | 3/1949 | Cornelius | 62/101 |
| 4,464,907 | 8/1984 | Mack et al. | 62/101 |
| 4,475,353 | 10/1984 | Lazare | 62/101 |
| 4,505,133 | 3/1985 | Malweski et al. | 62/476 |
| 4,667,485 | 5/1987 | Ball et al. | 62/476 |
| 5,024,064 | 6/1991 | Yonezawa et al. | 62/106 |
| 5,044,174 | 9/1991 | Nagao | 62/476 |

FOREIGN PATENT DOCUMENTS 2151007  7/1985  United Kingdom ...................... 62/476

OTHER PUBLICATIONS

Japanese Patent Unexamined Publication No. 57-105659.
Japanese Patent Unexamined Publication No. 2-78866.

*Primary Examiner*—Henry A. Bennet
*Assistant Examiner*—William C. Doerrler
*Attorney, Agent, or Firm*—Antonelli, Terry, Stout & Kraus

[57] ABSTRACT

In an absorption chiller comprising at least two chiller modules connected to each other and a method therefor in which an evaporator, an absorber, a condenser, a low-temperature generator, a high-temperature generator, a heat exchanger, an absorption solution pump and a refrigerant pump are functionally connected to one another, and gas, oil, vapor or exhaust gas discharged from a gas turbine, a diesel engine or another process is used as a heat source for the low-temperature generator or the high-temperature generator, the at least two chiller modules are connected to each other such that chilled water flows through the respective chiller modules in series while cooling water flows through the respective chiller modules in parallel, and that directions of flow of the chilled water and the cooling water are longitudinally reverse to each other in at least one chiller module which includes a final outlet for the chilled water, and, in the absorber of each chiller module, absorption solution is sprayed in at least two stages so that a concentration of the absorption solution becomes weaker toward the inlet side of the cooling water.

8 Claims, 2 Drawing Sheets

ABSORPTION CHILLER

BACKGROUND OF THE INVENTION

1. Industrial Field of the Invention

The present invention relates to an absorption chiller and more particularly, to a large-tonnage absorption chiller suitable for the district cooling system.

2. Description of the Prior Art

There have been publicly known arts, for example, as shown in Japanese Patent Unexamined Publication No. 2-078866 and No. 3-095364. The conventional arts individually employ a method of flowing chilled water through chillers in series, flowing cooling water through chillers in parallel, or spraying absorption solution in a plurality of stages in an absorber. However, an absorption chiller comprising a plurality of chiller units connected to each other, has not been publicly known, in which chilled water flows through the chiller units in series while cooling water flows through the chiller units in parallel, directions of flow of the chilled water and the cooling water are longitudinally reverse to each other in one chiller unit including a final outlet for the chilled water or the plurality of chiller units, and in the absorber in each chiller unit, absorption solution is sprayed in a plurality of stages.

When a scale of an absorption chiller is enlarged, flow rates of chilled water and cooling water are naturally increased and accordingly, the capacity of the transportation pump, sizes of pipes and the size of the cooling tower must be increased. An absorption chiller of a large scale is often used for district cooling system and installed in an overpopulated city for this purpose. Accordingly, it suffers various limitations concerning an installation space or a space where it occupies in a building or a certain place. In this connection, not only the chiller but also the whole plant including incidental equipments are required to be made compact. As for the chilled water, by setting the temperatures at the inlet and the outlet at 13° C. and 6° C., respectively, a difference of which is 1.4 times larger than that in the conventional machine in which the temperatures at the inlet and the outlet are set at 12° C. and 7° C., respectively, it is possible to reduce the amount of the chilled water to 70% of that in the conventional machine. As for the cooling water, by setting the temperatures at the inlet and the outlet at 32° C. and 40° C. respectively, a difference of which is 1.33 times larger than that of the prior art in which the temperatures at the inlet and the outlet are respectively set at 32° C. and 38° C., it is possible to reduce the amount of the cooling water to 75% of that in the conventional machine. However, any of the above temperature modifications makes it difficult for the chiller to fully carry out its performance. Further, a requirement for size reduction by about 20% to 25% of the conventional chiller is not satisfactorily fulfilled. In this connection, there occurs a necessity for some countermeasures of overcoming the problems.

In the case where the chiller is increased in size, it becomes impossible to transport the chiller as it is so that the chiller must be separated for transportation. On the other hand, the absorption chiller is sealingly charged with a lithium bromide solution which conspicuously corrodes iron under an oxygenic atmosphere. In order to prevent an inner side of the chiller from corrosion, it is necessary to maintain the inside of the chiller in a vacuum state. It is therefore the most important matter to separate the chiller while maintaining the inside of the chiller in a vacuum state in order to retain a reliability of the absorption chiller.

SUMMARY OF THE INVENTION

In order to solve the aforesaid problems of the prior art, according to the invention, a chiller is separated into at least two functional modules independent from each other. In the chiller according to the invention, chilled water is adapted to flow through the respective chiller modules in series while cooling water is adapted to flow through the respective chiller modules in parallel so that the cooling water counterflows with respect to the chilled water in at least one chiller module including a final outlet for the chilled water or the plurality of chiller modules. Further, in each chiller module, absorption solution is sprayed in at least two stages so that a concentration of the absorption solution becomes weaker toward the inlet side of the cooling water.

An operation performed by the above-described technical means is as follows.

In an absorption chiller comprising, for example, two chiller units in combination to perform a predetermined ability, one chiller unit on the side of an inlet for chilled water is called a first module, and the other chiller unit on the side of an outlet for the chilled water is called a second module. Because these chiller modules are completely independent from each other, an evaporation temperature in the first module differs from that in the second module. It is thus natural that the evaporation temperature in the first module which includes the inlet for the chilled water is higher than that in the second module. Accordingly, in the first module, a difference in temperature when heat is transferred from the low-temperature side to the high-temperature side is reduced, so that a size of the chiller module can be minimized. Meanwhile, since the cooling water is flowed through the respective chiller modules in parallel, conditions of the temperature of the cooling water in the first and second modules are equal to each other. In an absorber of each chiller module, the concentrated absorption solution returning from a generator is longitudinally sprayed successively from the outlet side for the cooling water in one or a plurality of stages, whereby a difference between the evaporation pressure in an evaporator and a saturation pressure at the temperature and concentration of the absorption solution can be effectively utilized for carrying out a satisfactory operation by the counterflows. As a result, both of the first and second chiller modules can be reduced in size. Particularly, in the second module which includes the final outlet for the chilled water, the chilled water and the cooling water are adapted to flow in such a manner that the temperature of the chilled water longitudinally becomes lower while the temperature of the cooling water longitudinally becomes higher. Therefore, an efficiency of the chiller module can be improved, which enables a size reduction of the chiller to be achieved.

DESCRIPTION OF THE PREFERRED EMBODIMENTS

One preferred embodiment according to the present invention will be described with reference to FIGS. 1 and 2.

Figure 1:
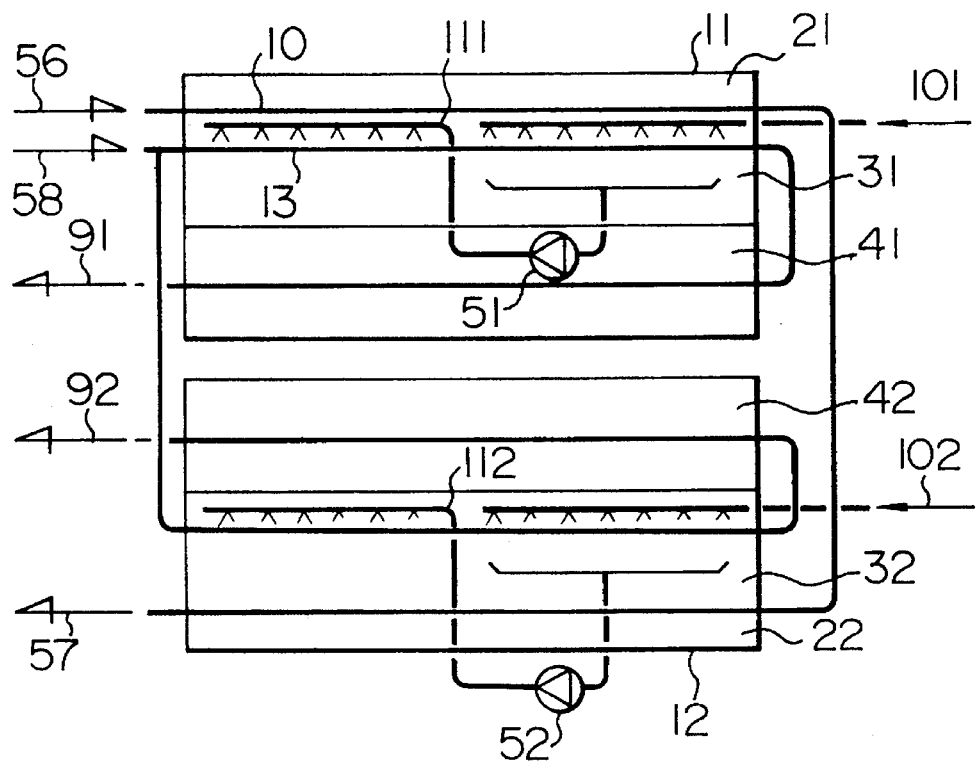
FIG. 1 is a flow chart of an absorption chiller comprising two chiller modules connected to each other according to one embodiment of the present invention, in which cascade cooling of chilled water, two-stage spraying in an absorber, and counterflowing of the chilled water and cooling water on the side of an outlet for the chilled water, are employed in combination.

FIG. 1 is a flow chart of an absorption chiller according to the present invention, in which two chiller modules are combined with each other. Chilled water 10 flows from a first module 11 to a second module 12 in series. Cooling water 13 flows through the first module 11 and the second module 12 in parallel. A longitudinal two-stage spray method is adopted in an absorber of each chiller module. More specifically, in the first module, high-concentration absorption solution 101 from a generator is sprayed on the side opposite to an inlet 58 for the cooling water. The absorption solution 101 is sprayed and diluted, and absorption solution 111 of a middle concentration is produced. The absorption solution 111 is sprayed on the side of the cooling water inlet 58 by means of a two-stage spray pump 51. Similarly in the second module, high-concentration absorption solution 102 from the generator is sprayed on the side opposite to the cooling water inlet 58. The absorption solution 102 is sprayed and diluted, and absorption solution 112 of a middle concentration is produced. The absorption solution 112 is sprayed on the side of the cooling water inlet 58 by means of another two-stage spray pump 52.

In the second module 12, the cooling water 13 is adapted to counterflow with respect to a direction of flow of the chilled water 10. By thus combining the first module and the second module with each other, it is possible to effectively utilize a difference between temperatures of the chilled water at the outlet and at the inlet therefor and a difference between temperatures of the cooling water at the outlet and at the inlet therefor in the absorber. This combination of the first and second modules can be carried out relatively easily and rationally.

Complete separation of the chiller into two modules (separation of cycles in all of an absorption solution system, a refrigerant system and a refrigerant vapor system) enables these two separated modules to be transported while maintaining insides of the modules in a vacuum state.

Figure 2:
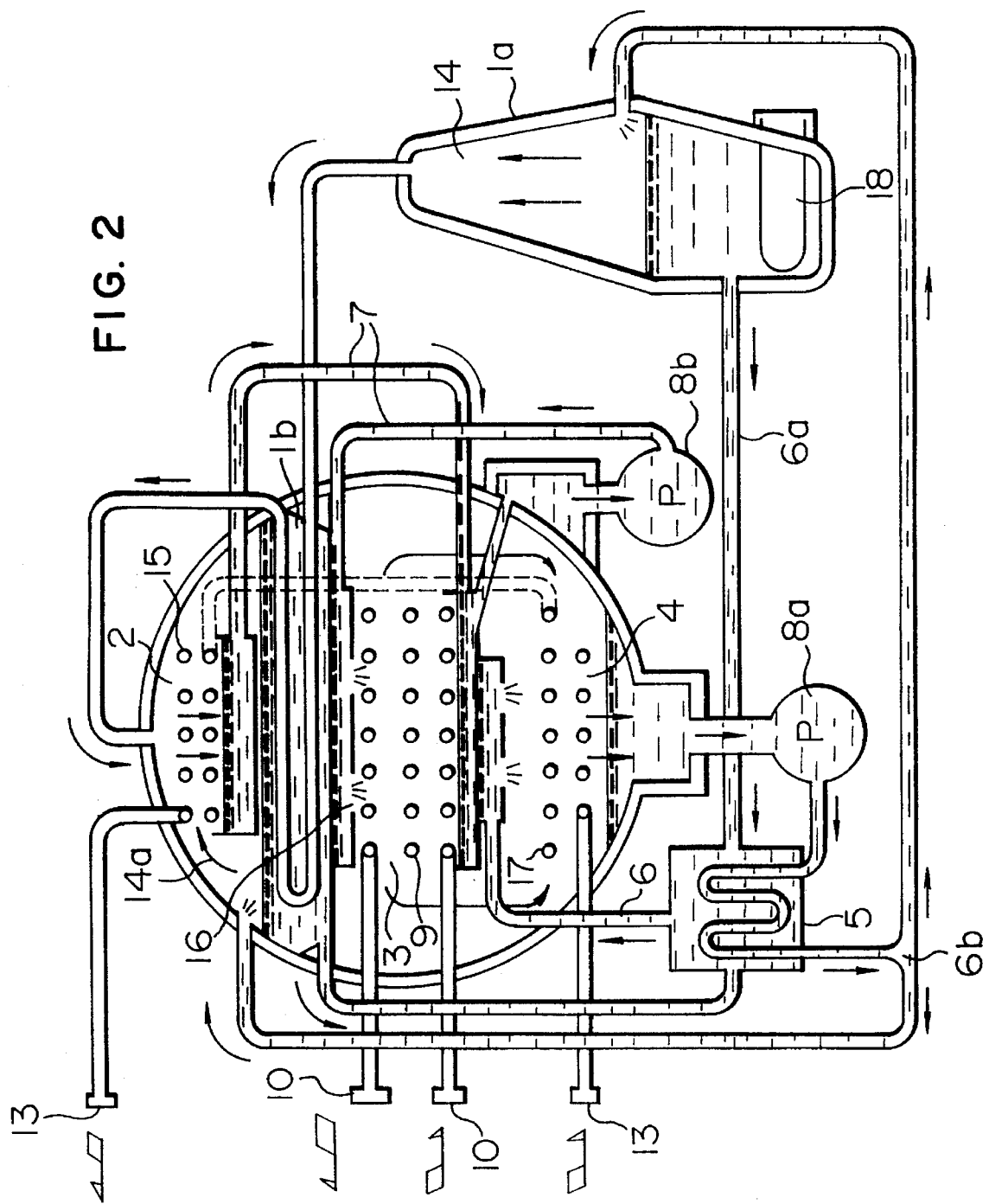
FIG. 2 is an explanatory view of a cycle in one of the chiller modules used in the absorption chiller according to the invention.

FIG. 2 is an explanatory view of a cycle in one module of a two stage absorption chiller according to the present invention, which is shown by way of example. The two stage absorption chiller comprises generators 1a, 1b, a condenser 2, an evaporator 3, an absorber 4, absorption solution 6, 6a, 6b, a refrigerant 7, pumps 8a and 8b for circulating the absorption solution and the refrigerant, and a heat exchanger 5. The respective members operate as follows.

Chilled water 10 flows through heat-transfer pipes 9 of the evaporator 3. The refrigerant 7 supplied from the refrigerant pump 8b is sprayed through a spray tree 16 to an area where the pipes 9 extend, so that a temperature of the refrigerant is lowered by the latent heat of vapor and accordingly, the water 10 flowing through the heat-transfer pipes is cooled.

Lithium bromide solution used as absorption solution has a vapor pressure which is largely lower than that of water at the same temperature and accordingly, it can absorb refrigerant vapor at a low temperature. In the absorber 4, refrigerant vapor evaporated in the evaporator 3 is absorbed by the lithium bromide solution (absorption solution) 6 sprayed on outer surfaces of cooling pipes 17 of the absorber 4. Absorption heat generated at that time is cooled by the cooling water 13 flowing through the pipes 17.

The diluted absorption solution 6b of a low concentration which has absorbed the refrigerant vapor in the absorber 4 is poor in absorbing ability. Consequently, part of the diluted absorption solution 6b is supplied to pass through the heat exchanger 5 by the absorption solution circulating pump 8a, so as to be delivered to the high-temperature generator 1a where it is heated by a heat source 18 such as a gas burner. As a result, refrigerant vapor at a high temperature 14 is evaporated and separated from the absorption solution 6b and accordingly, the absorption solution is concentrated. The concentrated solution 6a passes through the heat exchanger 5 to return to the absorber 4. Further, another part of the diluted absorption solution 6b from the absorber 4 is supplied to pass through the heat exchanger 5 by the absorption solution circulating pump 8a, so as to be delivered to the low-temperature generator 1b, where the absorption solution 6b is heated and concentrated by the high-temperature refrigerant vapor 14 generated in the high-temperature generator 1a. The concentrated absorption solution is mixed with the absorption solution 6a coming from the high-temperature generator 1a, and it returns to the absorber 4 as the high-concentration absorption solution 6.

The high-temperature refrigerant vapor 14 separated in the high-temperature generator 1a is condensed and liquefied in the low-temperature generator 1b and enters the condenser 2. Meanwhile, the refrigerant vapor 14a generated in the low-temperature generator 1b enters the condenser 2, in which the refrigerant vapor 14a is cooled by the cooling water 13 flowing through the cooling pipes 15, so as to be condensed and liquefied into the refrigerant. The refrigerant is mixed with the condensed liquid produced by the refrigerant vapor from the high-temperature generator 1a, which results in the refrigerant 7 to return to the evaporator 3.

In the heat exchanger 5, the diluted absorption solution 6b flowing from the absorber 4 to the high-temperature generator 1a and the low-temperature generator 1b is preheated by the high-temperature and high-concentration absorption solution 6a flowing from the high-temperature generator 1a and the low-temperature generator 1b to the absorber 4, thereby improving the heat efficiency.

The absorption solution circulating pump 8a circulates the lithium bromide solution (absorption solution), while the refrigerant pump 8b sprays the refrigerant (water) on the heat-transfer pipes 9 of the evaporator.

Figure 3:
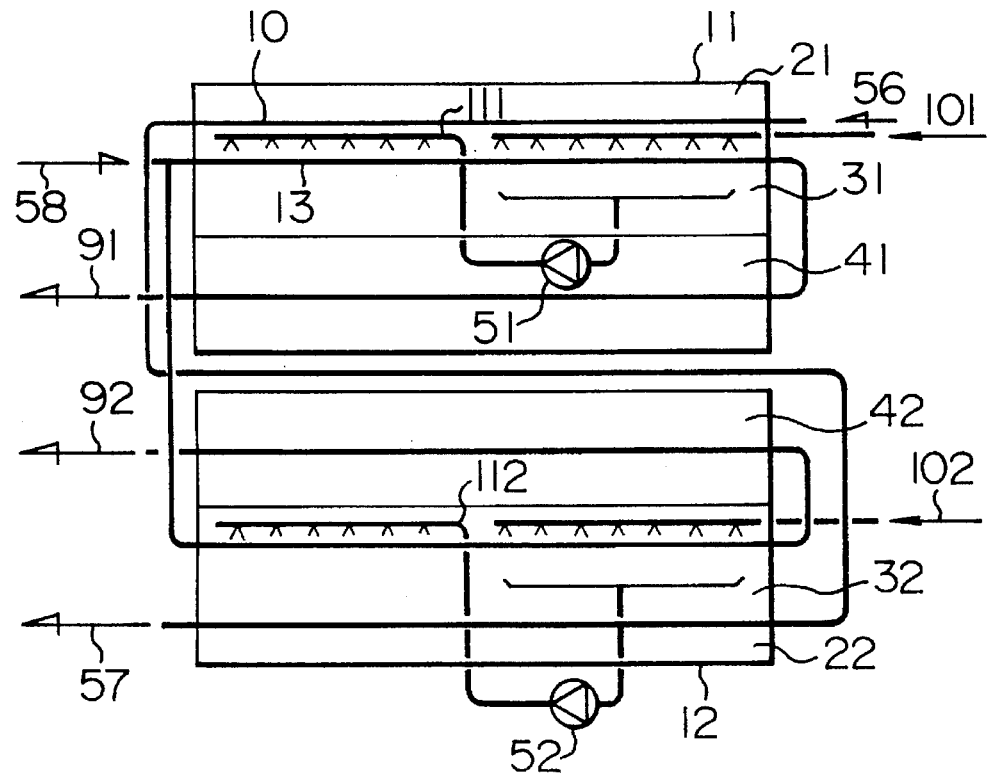
FIG. 3 is a flowchart of an absorption chiller comprising two chiller modules in combination according to another embodiment of the invention, in which chilled water and cooling water are adapted to counterflow with respect to each other in both of the chiller modules.

As in another embodiment shown in FIG. 3, the chilled water and the cooling water may be adapted to counterflow with respect to each other in both of the first and second modules.

With the above-described construction of the invention, there can be obtained preferable effects as mentioned below.

(1) In spite of strictness in temperature requirement of chilled water and cooling water, a size of an absorption chiller according to the invention can be reduced by about 25% as compared with a conventional machine.

(2) Because flow rates of the chilled water and the cooling water are decreased, pipes for the chilled water and the cooling water can be reduced in size, so that the whole plant can be made compact.

(3) It is possible to reduce a flow rate of the cooling water and to raise the temperature of the cooling water at the outlet of the chiller, and a cooling tower can be small-sized.

(4) It becomes possible to reduce the flow rates of the chilled water and the cooling water, and therefore, water pumps can be reduced in size and an electrical power of the pump can be saved.

What is claimed is:

1. An absorption chiller comprising at least two chiller modules in which an evaporator, an absorber, a condenser, a low-temperature generator, a high-temperature generator, a heat exchanger, an absorption solution pump and a refrigerant pump are functionally connected to one another, and gas, oil, vapor or exhaust gas discharged from a gas turbine, a diesel engine or another process is used as a heat source for the low-temperature generator or the high-temperature generator, wherein said at least two chiller modules are connected to each other such that chilled water flows through said respective chiller modules in series, cooling water flows through said respective chiller modules in parallel and directions of flow of the chilled water and the cooling water are reverse to each other longitudinally in at least one chiller module which includes a final outlet for the chilled water; and that, in the absorber of each chiller module, absorption solution is sprayed in at least two stages so that a concentration of the absorption solution becomes weaker toward the inlet side of the cooling water.

2. An absorption chiller according to claim 1, wherein said chiller modules are connected to each other such that directions of flow of the cooling water and the chilled water are longitudinally reverse to each other in all of said chiller modules except for a first module into which the chilled water and cooling water are first introduced.

3. An absorption chiller according to claim 1, wherein said chiller modules are connected to each other such that directions of flow of the cooling water and the chilled water are longitudinally reverse to each other in all of said chiller modules.

4. An absorption chiller system according to claim 1, characterized in that said chiller modules are two.

5. An absorption chilling method using at least two chiller modules in which an evaporator, an absorber, a condenser, a low-temperature generator, a high-temperature generator, a heat exchanger an absorption solution pump and a refrigerant pump are functionally connected with one another, and gas, oil, vapor or exhaust gas discharged from a gas turbine, a diesel engine or another process is used as a heat source for the low-temperature generator or the high-temperature generator, comprising the steps of:

connecting said at least two chiller modules to each other;

flowing chilled water through said respective chiller modules in series;

flowing cooling water through said respective chiller modules in parallel;

flowing the chilled water and the cooling water reversely to each other longitudinally in at least one chiller module which includes a final outlet for the chilled water; and spraying absorption solution in at least two stages in the absorber or each of said chiller modules so that a concentration of the absorption solution becomes weaker toward the inlet side of the cooling water.

6. An absorption chilled method according to claim 5, wherein in all of said chiller modules except for a first module into which the chilled water and cooling water are first introduced, the cooling water and the chilled water are flowed so that directions of flow thereof are longitudinally reverse to each other.

7. An absorption chilling method according to claim 5, wherein in all of said chiller modules, the cooling water and the chilled water are flowed so that directions of flow thereof are longitudinally reverse to each other.

8. An absorption chilling method according to claim 5, wherein said chiller modules are two.

* * * * *